United States Patent [19]

Karle et al.

[11] Patent Number: 4,686,146

[45] Date of Patent: * Aug. 11, 1987

[54] RADIATION-CURED RECORDING COMPOSITION WITH BI-PART LUBE

[75] Inventors: Dennis W. Karle, San Jose; Zie A. Payne, Cupertino; Fred C. Chung, Palo Alto; Ross P. Clark, San Jose, all of Calif.

[73] Assignee: Memorex Corporation, Santa Clara, Calif.

[ * ] Notice: The portion of the term of this patent subsequent to Apr. 21, 2004 has been disclaimed.

[21] Appl. No.: 830,402

[22] Filed: Feb. 18, 1986

[51] Int. Cl.⁴ .................... G11B 5/702; G11B 5/71
[52] U.S. Cl. .................... 428/425.9; 252/62.5 Y; 427/44; 427/128; 428/328; 428/329; 428/421; 428/422; 428/447; 428/694; 428/695; 428/900; 528/181
[58] Field of Search .................... 428/694, 695, 425.9, 428/421, 422, 447, 900, 328, 329; 252/62.5 Y; 360/134–136; 427/128, 44; 528/181

[56] References Cited

U.S. PATENT DOCUMENTS

| | | | |
|---|---|---|---|
| 3,490,946 | 1/1970 | Wolff | 428/900 |
| 3,523,086 | 8/1970 | Bisschops | 428/900 |
| 3,597,273 | 8/1971 | Akashi | 428/425.9 |
| 3,837,912 | 9/1974 | Roden | 428/900 |
| 3,983,302 | 9/1976 | Zucker | 428/900 |
| 3,993,846 | 11/1976 | Higuchi | 428/900 |
| 4,007,313 | 2/1977 | Higuchi | 428/694 |
| 4,007,314 | 2/1977 | Higuchi | 428/900 |
| 4,131,717 | 12/1978 | Hirano | 428/900 |
| 4,368,239 | 1/1983 | Nakajima | 428/520 |
| 4,409,300 | 10/1983 | Ohkawa | 428/694 |
| 4,416,947 | 11/1983 | Yoda | 428/694 |
| 4,416,948 | 11/1983 | Ohkawa | 428/694 |
| 4,431,702 | 2/1984 | Kawahara | 428/694 |
| 4,431,703 | 2/1984 | Somezawa | 428/900 |
| 4,456,661 | 6/1984 | Yamamoto | 428/694 |
| 4,469,750 | 9/1984 | Fujiki | 428/694 |
| 4,469,751 | 9/1984 | Kobayashi | 428/694 |

FOREIGN PATENT DOCUMENTS

| | | | |
|---|---|---|---|
| 0124707 | 9/1979 | Japan | 428/695 |
| 0124708 | 9/1979 | Japan | 428/695 |

OTHER PUBLICATIONS

R. Barclay, Jr., "Acrylated Urethane Oligomers—New Raw Materials for Adhesives", Radiation Curing, Aug. 1979, pp. 4–11.

*Primary Examiner*—Ellis P. Robinson
*Attorney, Agent, or Firm*—Townsend & Townsend

[57] ABSTRACT

A novel resinous binder composition is disclosed for a magnetic recording tape or like media. Magnetic particles are dispersed within a resinous matrix having both a "hard" and a "soft" component. The "hard" component is fabricated by exposing a resin capable of being cured by electron beam irradiation.

The magnetic recording media coating is very apt for use with harsh pigment like $CrO_2$ particles and is adapted for frequent contact with a head, being adapted to exhibit good durability, abrasivity, etc. by virtue of using a lubricant system including a fluoro-silicone oil and a compatible fatty-acid-ester like butoxy ethyl stearate.

54 Claims, No Drawings

RADIATION-CURED RECORDING COMPOSITION WITH BI-PART LUBE

BACKGROUND OF THE INVENTION

The following commonly assigned U.S. patent applications are referenced as involving related subject matter: U.S. Ser. Nos. 661,983 and 681,727.

A great deal of inventive effort has been expended in providing suitable magnetic tapes for use as information storage media. Such tape media find use in audio systems, instrumentation systems, computer systems and video systems. They usually comprise a passive backing sheet and an active, i.e. magnetic, coating on the backing sheet.

During use, these tapes are subjected to rather large mechanical stresses caused by quick-accelerating winding devices, abrasion from static parts associated with reading apparatus, cleaning blades, contact with guides, etc. These stresses most commonly cause an eventual wear of the magnetic coating which may manifest itself by spurious errors appearing in the information stored on the tape. Such errors can be drop-out (the loss of information) or drop-in (the spurious addition of information).

One of the most fruitful areas for improving magnetic tape performance has been formulation of improved binder systems for carrying electromagnetic particles which form the information-carrying component of the tapes. The binder must adhere to a backing film, for example, poly(ethyleneterephthalate)-type substrates, and provide an abrasion-resistant, oil-resistant material of good physical properties.

It has been taught in the prior art that in order to obtain sufficient durability and/or performance for magnetic media applications, it is necessary to cross-link or cure the binder material. Cross-linking is defined as the attachment of two chains of polymer molecules by bridges composed of either an element, a group or a compound which joins certain atoms of the chains by primary chemical bonds. Generally, cross-linking is required to impart sufficient toughness (area under the stress/strain curve) or to impart an appropriate soft/hard segment ratio to the binder system for the particular application. It is recognized that cross-linking decreases elongation and increases strength and resistance to thermal, environmental, hydrolytic and chemical attack. It is the balance between tensile strength and elongation that is necessary to define or quantize the toughness required for a given media application. Presently, cross-linking is achieved through a combination of chemical and thermal operations.

Poly(vinylchloride) was one of the first polymers to be used in forming binders for tapes, but that material lacked a number of desirable physical properties and also tended to degrade in the presence of iron oxide particles embedded within the polymer matrix. More recently, tape development work has been done using a large number of polymers. Linear thermoplastic polyurethanes of the polyester and polyether types are probably the most common major components of magnetic media binder systems. Polyurethane materials were recognized as contributing desirable chemical resistance (as to cleaning solvents) to the tape systems and also imparted desirable physical properties, such as abrasion resistance, to the tape. B. F. Goodrich offers a number of polyurethanes sold under the trade name ESTANE, which are polyurethanes of either the polyester or polyether type. As taught in U.S. Pat. No. 4,020,227, prior art binders have included, besides polyurethanes, polyurethane/vinyl chloride-vinyl acetate-vinyl alcohol copolymer combinations, polyurethane/phenoxy combinations, polyurethane/vinylidene chloride-acrylonitrile copolymers, as well as vinyl chloride-vinyl acetate-vinyl alcohol copolymer/acrylonitrile butadiene copolymers.

The cross-linking carried out to produce acceptable binder components has been achieved through a combination of chemical and thermal operations. They primarily employ multi-functional isocyanates to impart an appropriate degree of cross-linking or toughness to achieve a proper soft/hard segment ratio consistent with the particular application intended for the given tape. Although the exact mechanism of cross-linking is unknown because of the complexity of the systems involved, it is generally thought to occur via the reaction of "active hydrogen" groups of the binder or binder combination with the multifunctional isocyanates. Active hydrogen groups found both in polyurethanes and phenoxy resins, a common combination, have included such active moieties as $-NHC(O)O-$, $-NHC(O)NH-$, $-OH$, $-COOH$ and $-NH-$. Reaction with these groups can result in cross-linking via formation of allophanate, biuret, urethane and urea linkages.

It is commonly known that isocyanates are extremely sensitive to water. The active isocyanate groups react with water molecules according to the following equations:

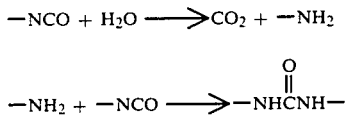

As a result of this, prior art processes have been constrained in the use of isocyanates and have turned to certain catalysts such as ferric acetylacetonate which favors allophanation rather than the reaction of the isocyanate with water. Furthermore, the use of isocyanate-containing resins for use as binders for magnetic tapes impose certain distinct process constraints. The coatings begin to harden spontaneously as cross-linking takes place and coating operations including the calendering of the binder layer surface must be accomplished during a narrow process window before a significant degree of cross-linking has occurred.

It is thus an object of the present invention to disclose a novel magnetic tape binder layer without the disadvantages outlined above.

It is a further object of the present invention to disclose a novel magnetic tape binder layer which is not highly dependent upon environmental constraints including the moisture content of the ambient surroundings.

It is yet another object of the present invention to disclose a novel magnetic binder layer which can be "hardened" at any time chosen by the process operator, even after all of the coating and calendering operations have taken place.

It is still another object of the present invention to disclose a novel magnetic tape binder layer which has both a hard and soft component so that the binder can be tailored to a specific end use, said components forming a semi-interpenetrating polymer network.

It is yet another object of the present invention to disclose a binder layer for magnetic tape which is hardened or cured solely through the use of electron beam irradiation.

BRIEF DESCRIPTION OF THE INVENTION

The present invention comprises a composition of matter useful as a binder for magnetic particles of a magnetic recording tape and the novel recording tape formed by using said composition. The composition comprises a matrix resin in the form of a semi-interpenetrating network comprising a hard component and a soft component whereby the hard component has been formed by electron beam curing. Preferably, the soft component comprises a polyurethane which is incapable of curing upon exposure of electron beam irradiation and a second component which is electron beam irradiation sensitive. Ideally, the second hard component is a resin of acrylate ester epoxy or acrylate urethane.

DETAILED DESCRIPTION OF THE INVENTION

The prior art has recognized the use of electron beam irradiation curable materials for use as binder layers for magnetic tapes. For example, Japanese Pat. No. 54-124709 discloses the use of materials having terminal acrylate or methacrylate groups, which are cross-linked by electron beam irradiation forming a rather brittle tough binder layer with little elongation.

Unlike the present invention, the subject Japanese patent fails to disclose a "soft" segment incorporated in its binder layer. By contrast, the present binder layer contains a reactive material and a non-reactive material, which upon complete cure results in an interaction between the materials and hence a soft/hard segment binder system which can be tailored to specific media application. This has been called a semi-interpenetrating polymer network, which is actually an intimate mixture of two or more distinct polymer networks that cannot be physically separated. This allows the processing of the binder layer whereby the process engineer can control the morphology by simply varying the ratio of the soft and hard components.

Japanese Pat. No. 47-12423 teaches a binder layer for a magnetic recording tape comprised of acrylate copolymers or homopolymers/polyester mixtures in combination with reactive monomers. It is believed that the acrylates as taught in this Japanese patent have been included therein to decrease the minimum dosage required to cross-link the polymeric species. It is well known to those skilled in the art that monomeric acrylates or methacrylates will decrease the minimum dosage required to cross-link polymeric species. See, for example British Pat. No. 1,287,143. Unsaturated (backbone unsaturated) polyesters do not cross-link at low dosages without the co-addition of acrylate materials as taught by S. H. Schroeter, Radiation Curing of Coatings, p. 117-120. Since Japanese Pat. No. 47–12423 contains low molecular weight acrylates the polyester therein should cross-link under the conditions listed therein. As such, the composition will be substantially completely reactive.

Japanese Pat. No. 47-12423 can be of a nature where either all of the disclosed materials are reactive or where there are some non-reactive materials present. When all of the materials are reactive, i.e., where there is a reactive monomer, cross-linkable polyester and polymeric acrylate with free acrylate groups, a binder would be formed which is highly cross-linked with no soft segment. In the case where there are non-reactive materials present such as oligomeric acrylates, or non-reactive polyesters, debris would form part of the binder layer which would seriously degrade the integrity of the cross-linked species and be detrimental to the binder layer in toto. By contrast, the present invention contains high molecular weight non-reactive components which will not generate debris.

The present invention discloses a binder for a magnetic tape which does not rely upon chemical or thermal cross-linking in its manufacture, but instead employs particulate irradiation in the form of electron beam irradiation to cure the binder. The electron beam irradiation can be accomplished in any manner which, upon reviewing the present disclosure, would be obvious to one skilled in the art. For example, a binder layer prepared according to the present invention can be cured by employing the Electrocurtain process of Energy Sciences, Inc. or one could even employ a magnetically scan system such as that offered by High Voltage Engineering.

Resin materials suitable as matrices for radiation cure can be classified as to position of the radiation curable moiety, such as (1) backbone group, (2) pendant group, and (3) terminal group. It has been observed that the terminal groups are more effective in achieving the objectives of the present invention. Of the electron beam curable resins, the most preferred materials are acrylate ester epoxy resins and acrylate urethanes. Although curing at a slower rate, methacrylate ester epoxy resins and methacrylate urethanes are useful in practicing the present invention. The most preferred materials can be represented by the following structures:

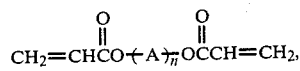

n = approximately 1 to 20
wherein A is

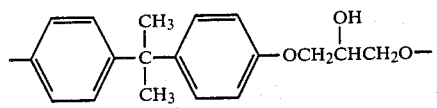

or a urethane of structure such as:

wherein: R₂ is an aliphatic group such as derived from 2-hydroxyethyl acrylate, 2-hydroxyethyl methacrylate, 3-hydroxypropyl acrylate and the like.

R₁ is an aliphatic or aromatic group derived from a multifunctional isocyanate such as toluene-2,4-diisocyanate, toluene-2,6-diisocyanate, diphenylmethane-4,4'-diisocyanate, 3,3'-dimethylbiphenyl-4,4'-diisocyanate, hexamethylene diisocyanate and the like.

R is a liquid polymer derived from the reaction of a polyhydric alcohol such as ethylene glycol, 1,3-propanediol, 1,4-butanediol and the like with a polycarboxylic acid such as adipic acid, sebacic acid, glutaric acid, pimelic acid, azelaic acid, suberic acid, terephthalic acid and the like.

The following table represents commercially available electron beam curable materials suitable in practicing the present invention:

TABLE I

COMMERCIALLY AVAILABLE ELECTRON BEAM CURABLE MATERIALS

| Trade Name Identification | Type[a] | Source |
|---|---|---|
| Epocryl 370 | AE | Shell |
| Celrad 3700 | AE | Celanese |
| Celrad 3702 | AE | Celanese |
| Uvithane 782 | AU | Thiokol |
| Uvithane 783 | AU | Thiokol |
| Uvithane 788 | AU | Thiokol |
| Uvithane 893 | AU | Thiokol |
| Hughson 753401-1F | AU | Lord |
| Hughson TS2935-71 | AU | Lord |

[a]AE = Acrylate ester epoxy. AU = Acrylate urethane.

Typical of acrylate ester epoxy resins suitable for practicing the present invention is Epocryl 370 available from the Shell Chemical Company. This resin is formed by reacting acrylic acid with a diepoxide, the product of bis-phenol A with epichlorohydrin. Uvithane is typical of the acrylate urethanes. Uvithane is available from Thiokol and is a proprietary composition likely being hydroxyalkyl acrylate-toluene diisocyanate-polyethylene adipate adducts with terminal acrylate groups. Typical polyurethanes for use with the electron beam curable components are, for example, Estane 5701 available from B. F. Goodrich, which is a polyester-type polyurethane, Morthane CA-250HV, which is a polyurethane of the polyester-type available from Morton Chemical Company and Plastothane 540, a polyester-type polyurethane available from Thiokol, Inc.

WORKING EXAMPLES

Before the actual examples are presented, several preliminary explanatory notes are in order.

All coatings and free films of the present examples were cross-linked or cured by exposure to electron beam irradiation using the Electrocurtain Process. This process employs a compact source of energetic electrons and may be viewed as a rather large triode vacuum tube. A grid-controlled curtain of electrons generated by an electron gun was subjected to an acceleration voltage of up to 200 kv and passed through a metal foil "window" on to air and finally to the product. It should be quite obvious that the compositions of matter herein disclosed are capable of experiencing cross-linking or cure through the use of other electron beam irradiation sources.

Irradiations were performed at several levels of dosage. Dosage is defined as the amount of radiation being absorbed per unit mass of material, the unit of dosage being the rad or the energy absorption of 100 ergs per gram of material. In the following examples, dosages were employed in the range of 1 to 15 megarad; megarad being one million rads or $10^8$ ergs per gram.

Various methods of binder layer fabrication were carried out to achieve dispersions acceptable for magnetic tape fabrication. In all methods, after an acceptable dispersion was obtained, the mixture was separated and/or drained from the dispersion medium whereafter various additives appropriate for each end use were added. The mixtures were then coated on polyethylene terephthalate and subjected to particle orientation. The coating was then dried and surface treated (calendered). The coatings thus obtained were cross-linked by exposure to electron beam irradiation at doses of 1 to 15 megarads in an inert atmosphere using the Electrocurtain Process.

The quantities of materials which were employed were manipulated so as to achieve final coating compositions as recited in Table II below. In each case, cyclohexanone was added to give a final coating solids of 32 to 40 percent in a minimum theoretical mix weight of 500 grams. Sufficient polyester-polyurethane resin was dissolved in cyclohexanone with stirring to produce a solution of 15 percent solids by weight.

As noted from viewing Table II, examples 1, 3, 4, 7, 9, 12–16, 23 and 34–36 illustrate the use of acrylate ester epoxy (AE) combinations, while examples 2, 5, 6, 8, 10, 11, 17–22 and 24 illustrate the use of acrylate urethane (AU) combinations. Other examples, namely, 25–31, illustrate the use of various other materials, such as amino-functional butadiene/acrylonitrile copolymers (ABAN), carboxylated butadiene/acrylonitrile copolymers (CBAN), polyacrylates (A), polyesters (PE) and polyurethanes (U). Lastly, the examples demonstrate the use of magnetic pigments having oil absorption numbers 45–90 together with various dispersion methods and binder/electron beam curable material combinations and ratios.

Each example employed one of six methods for preparing the various binder layers. They have been denominated A–F and are as follows:

METHOD A: A mixture of polyester polyurethane solution (15%) in cyclohexanone, soya lecithin, carbon black, magnetic pigment, electron beam curable material and cyclohexanone was charged into a steel container containing ⅛" steel balls. The mixture was then shaken on a paint can shaking machine, samples being removed periodically and assessed for dispersion quality using visual/microscopic techniques. After a good quality dispersion was obtained, the mixture was drained and separated from the steel balls, finaled with various additives and filtered. The mixture was then coated on polyethylene-terephthalate film, subjected to particle orientation, dried and surface treated (calendered). The coatings thus obtained were cross-linked by exposure to electron beam irradiation at dosages of 1 to 15 megarad under an inert atmosphere using the Electrocurtain Process.

METHOD B: A mixture of polyester polyurethane solution (15%) in cyclohexanone, soya lecithin, carbon black, magnetic pigment and cyclohexanone was charged into a steel container containing ⅛" steel balls. The mixture was then shaken on a paint can shaking machine, samples being removed periodically and assessed for dispersion quality using visual/microscopic techniques. After a good quality dispersion was obtained, the electron beam curable oligomer and cyclohexanone was added to the mixture and shaking continued until a good quality dispersion was obtained: After draining and separation from the steel balls, the mixture was finaled with various additives and filtered. The mixture was then coated on polyethylene-terephthalated film, subjected to particle orientation, dried and surface treated (calendered). The coatings thus obtained were cross-linked by exposure to electron beam irradiation at dosages of 1 to 15 megarad under an inert atmosphere using the Electrocurtain Process.

METHOD C: A mixture of polyester polyurethane solution (15%) in cyclohexanone corresponding to one half total required, soya lecithin, carbon black, magnetic pigment and cyclohexanone was charged into a steel container containing ⅛" steel balls. The mixture was shaken for one hour on a paint can shaker whereupon remaining polyester polyurethane solution (15%) in cyclohexanone and electron beam curable material was added to the mixture. The resulting mixture was shaken until a good quality dispersion was obtained, samples being removed periodically and being assessed using visual/microscopic techniques. After draining and separation, the mixture was finaled with various additives and filtered. The filtered mixture was then coated on polyethylene-terephthalate film, subjected to particle orientation, dried and surface treated (calendered). The coatings thus obtained were cross-linked by exposure to electron beam irradiation at dosages of 1 to 15 megarad under an inert atmosphere using the Electrocurtain Process.

METHOD D: A mixture of soya lecithin, carbon black, magnetic pigment, and cyclohexanone was charged into a steel container containing ⅛" steel balls. The mixture was shaken for one hour on a paint can shaker whereupon a polyester polyurethane solution (15 1) in cyclohexanone and additional cyclohexanone was added. The resulting mixture was shaken until a good quality dispersion was obtained, samples being removed periodically and being assessed using visual/microscopic techniques. Electron beam curable material and cyclohexanone was added and the mixture was shaken for an additional 1 to 2 hours. After draining and separation, the mixture was finaled with various additives and filtered. The filtered mixture was then coated on polyethylene-terephthalate film, subjected to particle orientation, dried and surface treated (calendered). The coatings thus obtained were cross-linked by exposure to electron beam irradiation at dosages of 1 to 15 megarad under an inert atmosphere using the Electrocurtain Process.

METHOD E: A mixture of soya lecithin, carbon black, magnetic pigment and cyclohexanone was charged into a container containing ⅛" steel balls. The mixture was shaken for one hour on a paint can shaker whereupon a polyester polyurethane solution (15%) in cyclohexanone as well as the electron beam curable material and cyclohexanone were added to the mixture. The resulting mixture was shaken until a good quality dispersion was obtained, samples being removed periodically and being assessed using visual/microscopic techniques. After draining and separation, the mixture was finaled with various additives and filtered. The filtered mixture was then coated on polyethylene-terephthalate film, subjected to particle orientation, dried and surface treated (calendered). The coatings thus obtained were cross-linked by exposure to electron beam irradiation at dosages of 1 to 15 megarad under an inert atmosphere using the Electrocurtain Process.

METHOD F: A mixture of polyester polyurethane solution (15%) in cyclohexanone, soya lecithin, conductive carbon and magnetic pigment was dispersed using a high energy dispersion process until a good quality dispersion was obtained, quality being assessed using visual/microscopic techniques. After separation and draining, additional polyester polyurethane solution (15%) in cyclohexanone, electron beam curable material, and cyclohexanone were added to the dispersion with stirring (Cowles stirrer). The resulting mixture was finaled with various additives appropriate to the application, adjusted to 35–38% solids, and filtered. The filtered mixture was then coated on polyethylene-terephthalate film, subjected to particle orientation, dried and surface treated (calendered). The coatings thus obtained were cross-linked by exposure to electron beam irradiation at dosages of 1 to 15 megarad under an inert atmosphere using the Electrocurtain Process.

The following Table II is a tabulated compilation of 36 exemplar formulations prepared according to the present invention.

TABLE II

FORMULATIONS EXAMINED

| Material | 1 | 2 | 3 | 4 | 5 | 6 | 7 | 8 | 9 | 10 | 11 | 12 |
|---|---|---|---|---|---|---|---|---|---|---|---|---|
| Estane 5701 | 13.30 | 13.30 | 13.30 | | 10.28 | 10.28 | 17.13 | 17.13 | | | | 7.19 |
| Morthane CA 250HV | | | | 13.30 | | | | | | | | |
| Plastothane 540 | | | | | | | | | | | | |
| Q-Thane PS-94M | | | | | | | | | 13.30 | 13.30 | 13.30 | |
| Vitel 6207 | | | | | | | | | | | | |
| Epocryl 370 | 7.21 | | | 7.21 | | | 3.15 | | 7.21 | | | 13.35 |
| Celrad 3700 | | | 7.21 | | | | | | | | | |
| Uvithane 783 | | | | | | | | | | 7.21 | | |
| Uvithane 788 | | 7.21 | | | 10.27 | | | 3.15 | | | | |
| Uvithane 893 | | | | | | 10.27 | | | | | 7.21 | |
| Hughson TS-34011F | | | | | | | | | | | | |
| Hughson TS 2935-71 | | | | | | | | | | | | |
| CBAN 700 | | | | | | | | | | | | |
| CBAN 730 | | | | | | | | | | | | |
| ABAN 800 | | | | | | | | | | | | |
| ABAN 810 | | | | | | | | | | | | |
| Tevista H | | | | | | | | | | | | |
| Acryloid AT 400 | | | | | | | | | | | | |
| Preparation Method | A | D | D | D | C | C | F | F | D | D | D | D |
| Binder Ratio (Resin/EB) | 65/35 | 65/35 | 65/35 | 65/35 | 50/50 | 50/50 | 85/15 | 85/15 | 65/35 | 65/35 | 65/35 | 35/65 |
| Pigment Oil Adsorption No. | 45 | 80–90 | 80–90 | 80–90 | 80–90 | 80–90 | 80–90 | 80–90 | 80–90 | 80–90 | 80–90 | 80–90 |
| Magnetic Pigment (%) | 71.32 | 71.32 | 71.32 | 71.32 | 71.33 | 71.33 | 70.89 | 70.89 | 71.32 | 71.32 | 71.32 | 71.34 |
| Additives (%) | 1.32 | 1.32 | 1.32 | 1.32 | 1.33 | 1.33 | 0.59 | 0.59 | 1.32 | 1.32 | 1.32 | 1.32 |
| Soya Lecithin (%) | 1.46 | 1.43 | 1.43 | 1.43 | 1.47 | 1.47 | 1.38 | 1.38 | 1.46 | 1.46 | 1.46 | 1.47 |
| Carbon Black (%) | 5.34 | 5.34 | 5.34 | 5.34 | 5.33 | 5.33 | 6.87 | 6.87 | 5.34 | 5.34 | 5.34 | 5.34 |
| Binder Type | U/AE | U/AU | U/AE | U/AE | U/UA | U/UA | U/AE | U/AU | U/AE | U/AU | U/AU | U/AE |
| | 1 | 2 | 3 | 4 | 5 | 6 | 7 | 8 | 9 | 10 | 11 | 12 |
| | \multicolumn{12}{c}{Example Number} |

TABLE II-continued

| | FORMULATIONS EXAMINED | | | | | | | | | | | |
|---|---|---|---|---|---|---|---|---|---|---|---|---|
| Material | 13 | 14 | 15 | 16 | 17 | 18 | 19 | 20 | 21 | 22 | 23 | 24 |
| Estane 5701 | 4.11 | 10.27 | 13.35 | 13.35 | 13.35 | 10.27 | 7.19 | 4.11 | 10.27 | 10.27 | 15.61 | 10.27 |
| Morthane CA 250HV | | | | | | | | | | | | |
| Plastothane 540 | | | | | | | | | | | | |
| Q-Thane PS-94M | | | | | | | | | | | | |
| Vitel 6207 | | | | | | | | | | | 1.03 | |
| Epocryl 370 | 16.43 | 10.27 | 7.19 | 7.19 | | | | | | | 3.70 | |
| Celrad 3700 | | | | | | | | | | | | |
| Uvithane 783 | | | | | | | | | | | | |
| Uvithane 788 | | | | | | | | | | | | 10.27 |
| Uvithane 893 | | | | | 7.19 | 10.27 | 13.35 | 16.43 | | | | |
| Hughson TS-34011F | | | | | | | | | | 10.27 | | |
| Hughson TS 2935-71 | | | | | | | | | | | 10.27 | |
| CBAN 700 | | | | | | | | | | | | |
| CBAN 730 | | | | | | | | | | | | |
| ABAN 800 | | | | | | | | | | | | |
| ABAN 810 | | | | | | | | | | | | |
| Tevista H | | | | | | | | | | | | |
| Acryloid AT 400 | | | | | | | | | | | | |
| Preparation Method | D | D | F | D | D | D | D | D | F | F | B | D |
| Binder Ratio (Resin/EB) | 20/80 | 50/50 | 65/35 | 65/35 | 65/35 | 50/50 | 35/65 | 20/80 | 50/50 | 50/50 | 76/5/19 | 50/50 |
| Pigment Oil Adsorption No. | 80-90 | 80-90 | 80-90 | 80-90 | 80-90 | 80-90 | 80-90 | 80-90 | 80-90 | 80-90 | 80-90 | 80-90 |
| Magnetic Pigment (%) | 71.34 | 71.34 | 71.34 | 71.34 | 71.33 | 71.33 | 71.34 | 71.34 | 71.34 | 71.34 | 71.34 | 71.34 |
| Additives (%) | 1.32 | 1.32 | 1.32 | 1.32 | 1.32 | 1.32 | 1.32 | 1.32 | 1.32 | 1.32 | 1.32 | 1.32 |
| Soya Lecithin (%) | 1.47 | 1.47 | 1.47 | 1.47 | 1.47 | 1.47 | 1.47 | 1.47 | 1.47 | 1.47 | 1.47 | 1.47 |
| Carbon Black (%) | 5.34 | 5.34 | 5.33 | 5.33 | 5.33 | 5.33 | 5.33 | 5.33 | 5.33 | 5.33 | 5.33 | 5.33 |
| Binder Type | U/AE | U/AE | U/AE | U/AE | U/AU | U/AU | U/AU | U/AU | U/AU | U/AU | U/PE/AE | U/AU |

| | Example Number | | | | | | | | | | | |
|---|---|---|---|---|---|---|---|---|---|---|---|---|
| Material | 25 | 26 | 27 | 28 | 29 | 30 | 31 | 32 | 33 | 34 | 35 | 36 |
| Estane 5701 | 10.27 | 10.27 | 10.27 | 10.27 | 13.35 | 10.27 | 10.27 | 16.23 | | 13.25 | 13.18 | 11.85 |
| Morthane CA 250HV | | | | | | | | | | | | |
| Plastothane 540 | | | | | | 10.27 | | | 13.34 | | | |
| Q-Thane PS-94M | | | | | | | | | | | | |
| Vitel 6207 | | | | | | | | 0.21 | | | | |
| Epocryl 370 | | | | | | | | 4.12 | | 7.15 | 7.11 | 4.36 |
| Celrad 3700 | | | | | | | | | | | | |
| Uvithane 783 | | | | | | | | | | | | |
| Uvithane 788 | | | | | | | | | 7.19 | | | |
| Uvithane 893 | | | | | | | | | | | | |
| Hughson TS-34011F | | | | | | | | | | | | |
| Hughson TS 2935-71 | | | | | | | | | | | | |
| CBAN 700 | 10.27 | | | | | | | | | | | |
| CBAN 730 | | 10.27 | | | | | | | | | | |
| ABAN 800 | | | 10.27 | | | | | | | | | |
| ABAN 810 | | | | 10.27 | | | | | | | | |
| Tevista H | | | | | 7.19 | | | | | | | |
| Acryloid AT 400 | | | | | | | 10.27 | | | | | |
| Preparation Method | C | C | C | C | C | C | C | B | D | D | D | F |
| Binder Ratio (Resin/EB) | 50/50 | 50/50 | 50/50 | 50/50 | 65/35 | 50/50 | 50/50 | 79/1/20 | 65/35 | 65/35 | 65/35 | 73.5/26.5 |
| Pigment Oil Adsorption No. | 80-90 | 80-90 | 80-90 | 80-90 | 80-90 | 80-90 | 80-90 | 80-90 | 60-62 | 60-62 | 60-62 | 60-62 |
| Magnetic Pigment (%) | 71.33 | 71.33 | 71.33 | 71.33 | 71.33 | 71.33 | 71.33 | 71.34 | 71.33 | 70.87 | 70.50 | 73.37 |
| Additives (%) | 1.33 | 1.33 | 1.33 | 1.33 | 1.33 | 1.33 | 1.33 | 1.32 | 1.34 | 1.48 | 2.47 | 3.77 |
| Soya Lecithin (%) | 1.47 | 1.47 | 1.47 | 1.47 | 1.47 | 1.47 | 1.47 | 1.47 | 1.47 | 1.46 | 1.45 | 3.55 |
| Carbon Black (%) | 5.14 | 5.14 | 5.14 | 5.14 | 5.14 | 5.14 | 5.14 | 5.33 | 5.33 | 5.30 | 5.27 | 3.01 |
| Binder Type | U/B | U/B | U/B | U/B | U/PE | U/U | U/A | U/PE/AE | U/AU | U/AE | U/AE | U/AE |

A number of experimental techniques were used to evaluate the degree of cross-linking of the resinous coatings of the present invention. Applicants attempted to test coating durability as a function of electron beam radiation dosage to determine how actual formulations paralleled theoretical predictions.

Hardness was measured using a Sward Hardness Rocker G. G. Sward, Ed., "Paint Testing Manual", 13th Ed., ASTM, 1972, p. 286. Hardness of the magnetic coating was measured as a function of radiation dosage, hardness generally increasing with dosage. Table III, below, lists the hardness numbers of several representative formulations as a function of dosage.

TABLE III

AS A FUNCTION OF DOSAGE

| Example No.[a] | Binder Type[b] | Hardness Number at Dosage (Megarad) | | | | | |
|---|---|---|---|---|---|---|---|
| | | 0 | 1 | 2.5 | 5 | 7.5 | 10 | 15 |
| 6 | U/UA | 23 | 27 | 31 | 39 | 37 | 37 | |
| 7 | U/AE | 28 | | 30 | | | | |
| 8 | .U/AE | 29 | | 32 | | | | |
| 9 | U/AU | 29 | | 43* | 47 | 49 | | |
| 10 | U/AU | 29 | | 35 | 36 | 37 | | |
| 11 | U/AU | 31 | | 35 | 37 | 33 | | |
| 12 | U/AE | | 35 | 48 | 51 | 51 | 48 | 44 |
| 13 | U/AE | 27 | | 45 | 48 | | | |
| 14 | U/AE | 25 | 27 | 36 | 46 | 48 | 45 | |
| 15 | U/AE | 24 | 29 | 34 | 37 | 41 | 40 | |
| 16 | U/AE | 25 | 24 | 33 | 38 | 39 | 42 | 38 |
| 17 | U/AU | 28 | 28 | 28 | 30 | 28 | 26 | 26 |
| 18 | U/AU | 21 | 28 | 28 | 30 | 31 | 29 | 31 |
| 19 | U/AU | 27 | 31 | 35 | 38 | 37 | 38 | 37 |

TABLE III-continued

AS A FUNCTION OF DOSAGE

| Example No.[a] | Binder Type[b] | Hardness Number at Dosage (Megarad) | | | | | | |
|---|---|---|---|---|---|---|---|---|
| | | 0 | 1 | 2.5 | 5 | 7.5 | 10 | 15 |
| 20 | U/AU | 26 | 32 | 35 | 38 | 36 | 36 | 32 |
| 21 | U/AU | 27 | 28 | 28 | 29 | 30 | 32 | 31 |
| 22 | U/AU | 25 | 24 | 27 | 31 | 31 | 33 | |
| 23 | U/PE/AE | 22 | 23 | 26 | 28 | 29 | 29 | |
| 24 | U/AU | 25 | | 36 | 37 | 37 | | |
| 29 | U/PE | 23 | | 24 | 24 | | | |
| 33 | U/AU | 33 | | 41 | 42 | | | |
| 34 | U/AE | 30 | 50 | 41 | 43 | 42 | 44 | 46 |
| 35 | U/AE | 30 | 36 | 40 | 44 | 46 | 43 | 47 |

[a]See Table II for description of example.
[b]U = urethane, AE = acrylate ester epoxy, AU = acrylate urethane, PE = polyester.

It is an important aspect of this invention to provide a resinous binder layer which can be tailored to a particular end use application. By varying the soft and hard components, one is capable, by practicing the present invention, of preselecting and controlling the tensile strength, elongation and hardness of the binder layer as dictated by a specific end use. To test these properties, various drawdowns were made on a suitable release surface (glass or polypropylene plates) using coating mixtures and a 7-15 mil drawdown knife. After drying, samples were removed from the release surface and subjected to electron beam irradiation at dosages of 1 to 15 megarad in an inert atmosphere using the Electrocurtain Process. The irradiated samples were then cut into specimens 0.5 inches wide and 3 inches long. Thicknesses of the samples were recorded to 0.001 inches. Testing was carried out using an Instron Universal Tester (Model TM/TML) at ambient conditions and at a constant strain rate within a given test series. A minimum of seven specimens were evaluated for each experimental condition whereby tensile strength and percent elongation were measured as a function of irradiation dosage. It was noted, as a general principle, that tensile strength increased and percent elongation decreased as dosage increased. Table IV lists the mechanical properties of several coatings as a function of dosage.

TABLE IV

MECHANICAL PROPERTIES OF REPRESENTATIVE COATINGS AS A FUNCTION OF DOSAGE

| Example No.[a] | Binder Type[b] | Test | Value at Dosage (Megarad) | | | | | | |
|---|---|---|---|---|---|---|---|---|---|
| | | | 0 | 1 | 2.5 | 5 | 7.5 | 10 | 15 |
| 2[c] | U/AE | Tensile (psi) | 249 | | 696 | 852 | 910 | 990 | |
| | | % Elongation | 63 | | 8.2 | 5.9 | 5.8 | 4.0 | |
| 7 | U/AE | Tensile (psi) | 451 | 637 | 652 | 706 | 765 | 757 | |
| | | % Elongation | 21.9 | 13.5 | 10 | 10.5 | 8.4 | 8.6 | |
| 12 | U/AE | Tensile (psi) | 182 | | 861 | 1025 | 1050 | 1122 | |
| | | % Elongation | 13 | | 3.1 | 2.2 | 1.5 | 1.1 | |
| 24 | U/AU | Tensile (psi) | 399 | | 1077 | 1283 | 1407 | | |
| | | % Elongation | 13 | | 7.2 | 5.3 | 4.6 | | |

[a]See Table II for description of examples.
[b]AU = acrylate urethane, U = urethane, AE = acrylate ester epoxy.
[c]Similar to example number 2.

An attempt was made to confirm the crosslinking density or degree of cure in practicing the present invention. After removal of the magnetic coating from the base film (polyethylene-terephthalate), a weighed aliquot (0.5 grams) of said coating was extracted with chloroform (17 ml) for eight hours using a Soxhlet extractor equipped with an aluminum thimble. Chloroform was evaporated and the resulting solid dried at 105° C. for 30 minutes to give the weight of extractable material. The amount of extractable material measured as percent extractables was utilized to compare the degree of cure or cross-linking of the irradiated coatings, cross-linking being an inverse function of the amount extracted. Table V, below, lists the percentage extractables for several coatings as a function of dosage.

TABLE V

EXTRACTABLES AS A FUNCTION OF RADIATION DOSAGE

| Example No.[a] | Binder Type[b] | % Extractables at Dosage (Megarad) | | | | | | |
|---|---|---|---|---|---|---|---|---|
| | | 0 | 1 | 2.5 | 5 | 7.5 | 10 | 15 |
| 1 | U/AE | 17.3 | | 8.3 | 7.0 | 5.3 | | |
| 2 | U/AU | 20.2 | 12.4 | 9.0 | 7.0 | 6.1 | 5.3 | |
| 3 | U/AE | 19.0 | 12.3 | 8.6 | 6.4 | 5.5 | 5.1 | |
| 4 | U/AE | 19.4 | 16.2 | 12.9 | 9.8 | 7.7 | 6.4 | |
| 5 | U/AU | 16.7 | 8.0 | 5.1 | 3.5 | | 3.0 | |
| 6 | U/AU | 20.4 | | | 6.7 | | 5.5 | 4.5 |
| 7 | U/AE | 18.6 | 16.5 | 12.7 | 9.1 | 8.1 | 9.2 | |
| 8 | U/AU | 17.8 | | | 11.6 | | | |
| 12 | U/AE | 21.1 | 9.5 | 6.1 | 4.1 | 3.0 | 3.0 | 2.6 |
| 13 | U/AE | 21.3 | | 5.4 | 3.3 | | | |
| 14 | U/AE | 20.2 | 11.9 | 7.3 | 5.3 | 4.2 | 3.9 | |
| 15 | U/AE | 18.4 | 11.5 | 9.4 | 7.2 | 6.2 | 5.4 | |
| 16 | U/AE | 20.4 | 13.3 | 9.4 | 7.3 | 6.1 | 5.5 | 5.0 |
| 17 | U/AU | 19.6 | 12.1 | 9.9 | 8.0 | 7.6 | 7.2 | 6.4 |
| 18 | U/AU | 19.5 | 11.4 | 8.2 | 6.3 | 5.6 | 5.0 | 4.7 |
| 19 | U/AU | 20.2 | 8.8 | 6.0 | 4.9 | 4.1 | 4.1 | 3.7 |
| 20 | U/AU | 19.6 | 6.5 | 4.1 | 3.1 | 2.9 | 2.8 | 2.4 |
| 21 | U/AU | 16.2 | 15.7 | 12.8 | 10.2 | 9.6 | 9.0 | 7.5 |
| 22 | U/AU | 15.8 | 11.5 | 9.2 | 7.6 | 6.9 | 6.1 | |
| 23 | U/PE/AE | 21.8 | 15.8 | 12.7 | 9.7 | 8.6 | 8.0 | |
| 24 | U/AU | 19.7 | | 7.3 | 5.8 | 5.2 | | |
| 25 | U/B | 16.5 | 14.8 | 14.9 | 13.7 | 13.4 | | |
| 26 | U/B | 20.8 | 17 | 19.8 | 20.2 | 20.1 | 18.7 | |
| 27 | U/B | 18.1 | 17.9 | 19.8 | 21.3 | 18.8 | 18.7 | |
| 28 | U/B | 16.2 | 16.5 | 16 | 15.7 | 15.2 | 14.7 | 13.3 |
| 29 | U/PE | 18.7 | 18.4 | 18 | 17.4 | 16.9 | 16.2 | 16.0 |
| 30 | U/U | 18.7 | 18.4 | 19.1 | 17.8 | 17.8 | | |
| 31 | U/A | 18.1 | | | 18.2 | | 17.8 | 17.4 |
| 32 | U/PE/AE | 20.1 | 15.1 | 11.9 | 9.2 | 8.4 | | |
| 33 | U/AU | 17.5 | | 7.5 | 6.2 | | | |
| 34 | U/AE | 18.6 | 10.4 | 8.0 | 5.8 | 5.3 | 4.6 | 4.0 |
| 35 | U/AE | 17.8 | 11.1 | 7.6 | 5.5 | 4.5 | 4.4 | 3.9 |
| 36 | U/AE | 15.9 | 11.3 | 8.5 | 6.8 | 5.9 | 5.5 | 4.2 |

[a]See Table II for description of examples.
[b]AE = acrylate ester epoxy, AU = acrylate urethane, PE = polyester, B = butadiene copolymer, U = urethane, A = polyacrylate It should be noted that in Examples 25 through 31, which contain CBAN, ABAN, polyacrylate, polyester and polyurethane, no detectable facile cross-linking was detected upon exposure to electron beam irradiation at dosages utilized herein. Although Examples 25 and 26 represent systems having resins with backbone radiation curable moieties, the percent extractables do not change significantly in a 1 to 15 megarad exposure. Example 30, which is a polyurethane system void of electron beam curable material, represents a commonly used conventional thermoplastic system, which, again, exhibits no cross-linking and little decrease in extractables over the exposure range investigated.

A number of experimental tests were conducted to evaluate and compare the performance of the magnetic tapes prepared in accordance with the present invention. The first has been designated the "6-inch shuttle computer tape durability test" wherein a 6-inch section of tape is recorded with binary "ls" and at an appropriate density (1600 cpi—characters per inch—or 3200 frpi—flux reversals per inch). The section of tape being tested is repeatedly "read back" while being shuttled on a Storage Technology Corporation Model 3600 tape drive equipped with a Memorex internally designed controller/certifier to program and monitor the test. The section of tape was shuttled until one or more frpi drop below an appropriate level or until a specific number of passes is achieved. It was arbitrarily determined that the limits utilized were 25 percent of the signal remaining or 30,000 forward read passes. Durability was defined in terms of the number of shuttles necessary to achieve the limits established above. Table VI thus lists computer durability for several representative coatings.

TABLE VII

RADIATION DOSAGE FOR REPRESENTATIVE SYSTEMS

| Example No.[a] | Binder Type[b] | Minutes at Dosage (Megarad) | | | | | |
|---|---|---|---|---|---|---|---|
| | | 0 | 1 | 2.5 | 5 | 7.5 | 10 | 15 |
| 33 | U/AU | 9.5 | | 13.7 | 11.7 | | | |
| 34 | U/AE | 16 | 18 | 19 | 18 | 16 | 11 | 16 |
| 35 | U/AE | 14 | 22 | 42 | 29 | 51 | 28 | 28 |
| 36 | U/AE | 0.6 | 0.6 | 0.4 | 1.0 | 11.6 | 7.3 | 9 |

[a]See Table II for description of Examples.
[b]U = urethane, AE = acrylate ester epoxy, AU = acrylate urethane.

What has been disclosed are new compositions of matter and magnetic recording tapes made therefrom which are not impacted by environmental, operator or process constraints. The new binders can be cross-linked after all process operations such as dispersion, coating, surface treatment etc. are completed. The new compositions do not have a "pot life" or a critical surface treatment window since the new compositions of matter are not affected by atmospheric conditions. As noted from the various tables above, the new compositions exhibit excellent mechanical properties and, in fact, possess mechanical properties which are better than binder systems produced by free radical initiators.

| Example No.[a] | Binder Type[b] | $K^c$ Shuttles at Dosage (Megarad) | | | | | | |
|---|---|---|---|---|---|---|---|---|
| | | 0 | 1 | 2.5 | 5 | 7.5 | 10 | 15 |
| 1 | U/AE | 550 | | 581 | 1100 | 934 | | |
| 2 | U/AU | 16 | 7 | 54 | 333 | 504 | | |
| 3 | U/AE | 9 | 14 | 257 | 200 | 176 | 56 | |
| 5 | U/AU | 44 | 121 | 1000 | 32 | 110 | 411 | |
| 6 | U/AU | 57 | 422 | 177 | 90 | 141 | 148 | 151 |
| 9 | U/AE | 49 | | 122 | 155 | 1000 | | |
| 10 | U/AU | 100 | | 1000 | 118 | 194 | | |
| 11 | U/AU | 49 | | 199 | 385 | 1000 | | |
| 7 | U/AE | 65 | | | 157/268 | | | |
| 8 | U/AU | 298 | | | 473 | | | |
| 23 | U/PE/AE | 31 | 17 | 20 | 29 | 62 | 1000 | |
| 32 | U/PE/AE | 289 | 521 | 1000 | 1000 | 1000 | | |

[a]See Table II for description of examples.
[b]U = urethane, AE = acrylate ester epoxy, AU = acrylate urethane, PE = polyester.
[c]K = 1000

As noted by viewing Table VI, computer durability generally increases with irradiation, peak durability usually being observed in the range of 2.5 to 7.5 megarad. There are exceptions such as Example 6 which exhibits peak durability at 1 megarad dosage.

The tapes of the present invention were also subjected to a "video drum durability tester". In this test, a Memorex designed video still frame durability tester was used. This tester consists of an Ampex Mark IX video head ISA, Type K, equipped with a chromelp/alumel thermocouple fabricated in a mode that will simulate still-framing on a helical scan video recorder. Tape tension was determined by hanging weights, while head-tape velocity was controlled by a variable speed DC motor and controller and head penetration was controlled by appropriate instrumentation. Surface durability failure was indicated by a temperature change at the tape head interface as measured by the head thermocouple and chart recorder. Durability was defined in terms of minutes necessary for the temperature to change at the tape/head interface. Table VII lists video durability for several representative coatings.

The novel compositions of matter of the present invention cross-link without the need for post-cure heating. Elimination of post-cure heating substantially removes problems, such as rollset and/or substrate distortion. The present system cross-links immediately upon exposure to electron beam irradiation while prior art systems require prolonged and finite storage at some predetermined cure temperature or regime in order to attain maximum cross-link density or properties. This cure cycle can vary from hours to days depending upon the chemistry and temperature involved.

This invention also relates to a magnetic recording composition adapted for coating on a non-magnetic tape base or the like, and more particularly to such including an improved lubricant system incorporated therein, especially for media using chomium dioxide magnetic powder.

BACKGROUND, FEATURE OF INVENTION

Workers in the art of making and using magnetic recording apparatus are well aware that the media therefor experiences tremendous wear problems. A magnetic recording tape slides across a magnetic recording head, guide members, etc., at relatively high speeds and is apt to undesirably abrade both itself and the head, with a foreshortened useful life for both.

A related problem is that of undesirably high friction between the tape surface and the head surface. To ameliorate abrasion, workers typically require that a tape coating exhibit a certain (maximum) coefficient of friction—this also reduces the reel-force necessary to pull the tape past the head. To reduce friction and enhance wear, workers have resorted to various expedients such as "lubricated" tape coatings.

Such lubricated coatings are particularly important for magnetic tape (or like flexible disks) of the type used in computer recording, or in conjunction with video or audio recording where the relative head-medium velocity is very high, producing aggravated abrasion and reduced life (durability) of both head and media. Thus, workers have resorted to various lubricant means for such tape coatings and like media (e.g., see the following U.S. Pat. Nos.: 3,490,946, 3,492,235, 3,523,086, 4,431,702, 3,983,302, 3,837,912, and 3,597,273).

It is an object of this invention to address such problems and particularly to teach novel magnetic recording compositions including improved lubricant systems, especially for such media which use chromium dioxide magnetic powder.

It is a more particular object to do so using a fluorosilicone (FS) lubricant compound in combination with a "fatty acid ester" lubricant (FAE). More particularly, it has been found that such an "FS/FAE" lubricant provision of a novel "high density/high performance (e.g., 30,000 flux transitions per inch feasible) chromium dioxide computer tape" that uses, a magnetic coating with FS/FAE lubricants to good advantage. For instance, compared with a standard ferric oxide computer tape, such a novel tape coating can give much higher storage density yet remain less abrasive than many standard ferric oxide tapes and give more durability than most—something that will surprise workers!

A salient form of the new magnetic recording compositions is for magnetic $CrO_2$ coatings for high density-high performance computer tape. Such tapes have heretofore exhibited unsatisfactory durability and abrasivity, etc.—such as to be commercially unattractive. For instance, their durability and abrasivity are satisfactory—problems which an FS/FAE lube system of the invention addresses.

The "fluorosilicone/FAE-lube" coatings of the invention are characterized by a fluorosilicone oil component in combination with a compatible stearate or like fatty acid ester component.

Now workers have, of course, incorporated lubricant components into a magnetic recording layer (with the pigment, binder, etc.). For instance, lubricants such as molybdenum disulfide, graphite or a wax have been suggested for use with a magnetic powder like gamma $Fe_2O_3$ and a binder like polyvinyl chloride. But such lubricants are not effective in giving the kind of superior durability (and low abrasivity) we desire; also, in heavy concentrations they can impair magnetic performance (e.g., see U.S. Pat. No. 4,431,703).

And workers are familiar with suggestions for using such lubricating agents as parafinnic hydrocarbons, fatty acids or esters or silicone oils (e.g., dimethyl- or diphenyl-silicone oil)—yet those don't give adequate durability or lubricity to the media, and can cause "bleeding" or "blooming" when used in large concentrations.

Some workers have suggested certain organo-polysiloxane/-polysilicone compounds as lubricants for magnetic recording media (e.g., see U.S. Pat. Nos. 3,993,846, or 4,007,314, or 4,131,717—or U.S. Pat. No. 4,007,313 mentioning an organo-silicone-fluoride lubricant; U.S. Pat. No. 4,431,703 suggests a like lubricant with various magnetic materials such as $CrO_2$).

General aspects of embodiments

Certain salient features of our developments will come to mind upon review of this specification.

For instance, we prefer to formulate our lubricant system to comprise a liquid fluorosilicone plus compatible FAE component(s). The FAE component(s) will preferably comprise one or several compatible aliphatic (saturated or unsaturated) type fatty acid esters such as butoxy ethyl stearate. These are especially adapted for in-contact media using harsh pigment like chromium dioxide magnetic particles—they will be employed in concentrations apt for improved commercially—superior media (with good durability and reduced abrasivity). "In-contact" media are characterized by continual, or periodic frequent contact of a head therewith—as distinguished from media which seldom or never are so contacted.

Such tape coating formulations will be recognized by workers as useful with virtually any cooperating binder system—such as those characterized by various polyesters or poly ethers (especially urethane), epoxy or phenoxy, various "vinyls" (e.g., vinyl chloride, vinyl acetate copolymer, "vinnol" trade name, vinylidene chloride-acrylonitrile copolymer, polyvinyl butyral or the like), acrylics or acrylonitrile butadiene copolymer, nitrocellulose, etc.; or various mixtures thereof suitable for magnetic recording (tape) formulations, as artisans will recognize, along with other compatible ingredients of the usual kind.

Such lube systems will be recognized as suitable for magnetic tape record compositions, being particularly apt for use with "harsh", highly abrasive, powders (pigment) like chromium oxide.

At the indicated concentrations, one should expect the fatty acid ester (FAE) constituent(s) to function as a lubricant-plasticizer and as a "migratory" lubricant (to some extent); while the FS (fluorosilicone) oil will act as a "migratory" lubricant. The fluorosilicone oil should be used preferably in the low-to-moderate molecular weight form, since high molecular weight forms are "solid" at useful temperatures, and appear to be impractical (e.g., likely to cause coating application difficulties).

This fluorosilicone oil is added as a liquid compound; and is formulated to be compatible with the binder-solvent used, while being incompatible with the binder per se (at least sufficient to perform its migrant lubricating function, as understood by workers in the art).

PRIOR ART

Following are some instances, A, B and C, of relatively more conventional magnetic recording computer tape formulations, including more conventional lubricant systems, loaded however with $CrO_2$ magnetic powder (assume 68–82%). These should be considered by way of background, and preface, to discussion of the novel lubricant systems of the invention.

---

Instance A: $CrO_2$ a - $CrO_2$ magnetic powder
b - Soya lecithin
c - Carbon

-continued

| d - Binder | — polyurethane polymer plus phenoxy<br>— cross linker (isocyanate type)<br>— catalyst | |
|---|---|---|
| | | wt. % (of solids) |
| e - Lubricant System | — Myristic Acid (role: NML) | 0.1–1.0 |
| | — Lauric Acid (NML) | 0.1–1.0 |
| | — Butyl Stearate (P/ML) | 0.5–3.0 |
| [f - Solvent: | 60–70 wt. % of total mixture] | 0.7–5.0 |

| Instance B: as Inst. A, but with Modified Lubricant | | |
|---|---|---|
| | | wt. % (of solids) |
| e' - Lubricant System | — Zinc Stearate (NML) | 0.2–1.0 |
| | — "Armid HT" (Stearamide) (ML) | 0.05–1.0 |
| | — Butyl Stearate (P/ML) | 0.9–3.0 |
| | | 1.15–5.0 |

| Instance C: as Inst. A, but with other Modified Lubricant | | |
|---|---|---|
| e" - Lubricant System | — Silicone oil (ML) ("MolyKote 4-3600") | 0.05–2.0 |
| | — Butoxyethyl stearate (P/ML) | 0.1–4.0 |
| | | 0.15–6.0 |

P: plasticizer
ML: lubricant
NML: non-migrating lubricant

Workers know that lubrication systems for such "high performance" magnetic recording compositions have been known to utilize a "compatible" or "fixed" constituent (being compatible with the binder system and acting as a lubricant and plasticizer, being incorporated into the recording composition); as well as a "non-compatible", or migratory, lubricant-constituent, one intended to migrate to the coating (tape) surface to function as a lubricant there, (e.g., according to a well-known "ablative" process).

Workers will appreciate that Inst. A has relatively little migrating component—and thus will exhibit high abrasivity and poor durability (short "life"). The two NML components are optional; a single one may be substituted.

In the foregoing Instances A, B and C, lubricant is preferably incorporated into the magnetic coating composition prior to applying the coating to its (non-magnetic) substrate such as a tape base of mylar, or the like. Of course, as workers know, lubricants have been applied in other ways; for example, as a protective super-film atop a magnetic coating.

Of course, such magnetic coating compositions are here assumed to include $CrO_2$ as the particulate magnetic material (suspended in the binder formulation). It will be understood that any of the known binder materials generally employed in the production of recording media (contact recording) can be used and in conventional proportions as aforesaid.

A measure of how efficient a lubricant is (e.g., in a computer tape or disk application) is "media-durability". For instance, with computer tape, one measures media wear (durability) using a "six-inch media shuttle test" (cf. GSA interim Federal specification #W-T-k0051C). "Durability" improves, of course, as the tape passes more shuttle cycles. We so tested various lubricants for dubability (incorporating many in a "test magnetic tape coating formulation" having 60 to 90% polyurethane and 10–40% phenoxy, plus wetting agents and crosslinking agents in minor concentrations. Lubricant materials tested included: butyl stearate, zinc stearate, stearamide (ARMID HT), and silicones (among others). Test results are given below.

Tape recording formulations which include harsh powders like $CrO_2$ present certain nasty problems to conventional lubricants as below-mentioned.

Special problems with $CrO_2$ powders

Generally speaking, workers can increase storage density by usng magnetic particles having higher coercive force, like $CrO_2$ (chromium dioxide). For higher density, the width of the head-gap is typically reduced and R/W frequency increased; hence the R/W signal penetrates far less (into a tape coating). Thus, the "active" recording area becomes a very thin layer on the tape surface. Hence, tape coatings for $CrO_2$ will be thinner, the coating thickness depending largely on head design.

Such $CrO_2$ tapes were made, using a conventional binder system (cf. principally "Estane" as urethane and PKHJ Phenoxy polymers), along with a novel FS/FAE lubricant system according to this invention (including a fluoro-silicone oil and a "fatty acid ester". Lubricant concentration levels were devised to give superior tape durability and low abrasion characteristics.

Characteristics of Chromium Dioxide

Unlike ferric oxide compounds, chromium dioxide does not exist in nature and must be synthesized. Chromium dioxide particles are acicular (slender and needle-like), with unusually uniform physical properties. (cf. $CrO_2$ crystals are 0.6 to 0.8 micrometers long with an aspect ratio of 10–15 to one; they have a precise shape, almost free of dendritic appendages. The crystals are also quite dense and nonporous.)

For a perspective on how well such small, precisely-shaped magnetic particles can function in recording media, consider the following: A linear-recorded bit density of 10,000 bits per inch means that each recorded flux transition will occupy 100 micro-inches along the recorded track. $CrO_2$ crystals are about 20 to 30 micro-inches long; and therefore, only about 3.3 to 5 $CrO_2$ crystal lengths can be fit into such a (100 micro-inch) recorded bit length.

$CrO_2$ crystals are so uniform and so small that they yield a relatively high "energy product" (measure of ability to retain magnetic flux in the presence of demagnetizing fields)—e.g., higher than ferrous or "cobalt-modified iron oxide" materials. $CrO_2$ particles appear to provide a narrower distribution of switching field energy than do other particles—that is, they include relatively fewer particles that will "not switch" under normal fields.

Because $CrO_2$ particles are "nondendritic" (i.e., exhibit no branching appendages, or arms), they can be packaged together more tightly (e.g, vs ferrous), with few voids. Thus, media using chromium dioxide allow thinner coatings (to maintain a given flux)—this giving increased pulse definition for a given output signal strength.

Durability problems (e.g., head wear) with such "harsh" ($CrO_2$) oxide media derive from such factors as: they very small particle size and resulting high surface area and the higher-than-normal "loading" [78 weight percent, vs about 69 weight percent for standard iron oxide computer tapes]—this decreasing the available [percentage of] binder material and so compromising coating strength. This makes $CrO_2$ tapes so abrasive as to be unsatisfactory in many commercial contexts.

Now, one special feature of our novel lubricant system is that the liquid fluoro-silicone migratory component provides especially good "interfacial lubrication" [between head and tape surfaces] and so ameliorates and need for high coating strength while tolerating reduced binder percentage.

Workers will recognize that our novel lubricant systems also reduce the characteristic abrasivity of $CrO_2$ tapes, making them more commercially feasible for high density digital recording.

Superior results

Workers will not be surprised that such $CrO_2$-loading in conventional tape coatings makes the tape so harsh and abrasive as to be brief-lived and impractical for the contemplated digital recording (e.g., vs typical video recording tape which actually uses tape-abrasion to "clean" the R/W head). For instance, with conventional lubricant systems like those in Inst. A, B or C, the $CrO_2$ tape will wear-out the heads after a mere 70 hours or so of use (computer applications). Yet, substituting an FS/FAE lubricant system according to the invention can extend head life to the order of 500 hours or more.

The present invention provides a solution to such problems whereby harsh abrasive ($CrO_2$) high density digital recording tapes may be made practical commercially [reasonably low abrasivity, high durability-life] by the mere inclusion of our novel FS/FAE lubricant system including fluoro-silicone and "fatty acid ester" components—as the following Examples show in some detail.

The invention will be better appreciated by workers upon consideration of the following detailed description of some preferred embodiments.

DESCRIPTION OF PREFERRED EMBODIMENTS

General description, background

Example I illustrates a magnetic (tape) recording composition formulated according to principles of this invention. This, and other means discussed herein, will generally be understood as selected, formulated, and operating as presently known in the art, except where otherwise specified. And, except as otherwise specified, all materials, methods, and devices and apparatus herein will be understood as implemented by known expedients according to present good practice.

A relatively conventional computer tape coating is prepared according to the invention being modified to include $CrO_2$ magnetic powder and novel lubricant system especially formulated to accommodate $CrO_2$. This lubricating system comprises a liquid fluoro-silicone oil and a "fatty acid ester" such as butoxy ethyl stearate. This FS/FAE lubricant system will be seen to improve tape durability and reduced abrasivity, in a surprising fashion, accommodating the "harsh" $CrO_2$ pigment. This lubricant system is especially adapted to accommodate chromium dioxide magnetic powder, and thus facilitate high-density digital recording (e.g., order of 30,000 ftpi).

Following is a specific Example of such a tape composition embodiment used in the practice of the present invention. This composition is prepared to include the following components in the indicated concentrations.

Example I

| Role | Component | wt. % Coating Mix | Pref. wt. % Coating Solids | Broad wt. % (Range) | Pref. wt. % Range (Solids) |
|---|---|---|---|---|---|
| | (a) Magnetic Oxide ($CrO_2$) | 26.12 | 78.77 | 68–82 | 74–80 |
| dispersant | (b) Soya Lecithin | 0.51 | 1.54 | 0.5–6.0 | 2–3 |
| conduc. agt. | (c) Carbon XC-72R | 0.33 | 1.00 | 0.5–7.0 | 1–4 |
| binder | (d) Estane 5701 F1 | 4.00 | 12.06 | 4.0–20.0 | 10–16 |
| (cross-link) | (e) Phenoxy PKHJ | 1.33 | 4.01 | 1.0–10.0 | |
| | (f) Polyisocyanate mondur CB-60 | 0.16 | 0.48 | 0.1–4.0 | .5–2 |
| catalyst | (g) FeAA** | 0.01 | 0.03 | 0.001–1.0 | .05–.2 |
| lube sys. | (h) Butoxyethyl Stearate | 0.62 | 1.87 | 0.2–10.0 | 1–7* |
| | (i) Fluoro-silicone FS-1265 | 0.08 | 0.3–.4 | 0.1–10.0 | .4–3 |
| solvent | (j) Cyclohexanone | 66.84 | | | |

*e.g., 3x–12x FS oil
**optional, to accel. cure

| Function and Purpose of Ingredients: | |
|---|---|
| Ingredients | Function and Purpose |
| (a) Magnetic Oxide | chromium dioxide is the ("harsh") magnetic powder - used here to yield high output signal performance at high recording densities (e.g., 10–30K FTPI). DuPont's magnetic chromium dioxide powder is a suitable $CrO_2$. This formulation is optimized for an oxide loading level of about 79% by weight. |
| (b) Soya Lecithin | A liquid soya lecithin is preferred (e.g., 3 FUB by Central Soya or GAFAC RE-610, complex phosphate esters of non-ionic surfactants of the ethylene oxide-adduct type by GAF - also see U.S. Pat. No. 4,420,537). This dispersant is used to assist in thoroughly wetting-out and dispersing the pigment agglomerates ($CrO_2$, Carbon). Ideally, each acicular ($CrO_2$) particle will be separated from its neighbor in the binder matrix. Other like (natural or synthetic) |

-continued

Function and Purpose of Ingredients:

| Ingredients | Function and Purpose |
|---|---|
| (c) Conductive Carbon | dispersants will occur to workers. "Vulcan Carbon Black XC-72R" for conductivity control (by Cabot Corp.) is used or a like conductive carbon powder. Chromium dioxide, in itself, is more conductive than conventional gamma ferric oxides and cobalt modified iron oxides. To give a more representative finished tape resistivity (0–1000 MΩ/square), a minimum of 0.5% conductive carbon should be incorporated. This should also stabilize resistance, resulting in a manufacturable uniform product. Tape conductivity must be regulated to avoid build-up of static charge which can interfere with proper transport of the tape and cause loose debris to collect on the tape, leading to loss of data ("dropouts") and general untidiness. |
| (d) Estane 5701F1 | is a representative (polyesterurethane) binder polymer; with phenoxy, here it forms the binder bulk. (Estane 5701F1 is a preferred polyesterurethane because of its high abrasion resistance and selected solvent compatibility.) In many instances, another polyurethane ester may be substituted that yields a compatible mixture and is solvent-system-compatible; and that will cause the FS oil to migrate. Other binder materials useful with such $CrO_2$ (computer tape) formulations will be evident; [polyurethane and vinyl types are preferred]. |
| (e) Phenoxy PKHJ/PKHH | (by Union Carbide) are representative (phenoxy polymer) binder co-constituents with the polyester urethane (Estane 5701F1) and cross-linker (below). Estane 5701F1 and either, or both, phenoxy (PKHH or PKHJ) combine nicely to form a binder system which provides excellent adhesion and cohesion (for the $CrO_2$ and carbon on the basefilm); and which will also contribute to good durability, low abrasivity, and low "wiper debris" and "clog". Due to the high oxide ($CrO_2$) loading level required here for the desired output performance, the Estane-PKHJ/PKHH ratios are best blended at 75/25 ratio (range: 50/50–90/10) to give good adhesion and cohesion. Test results indicate excellent "6-inch shuttle durabil- |

Function and Purpose of Ingredients:

| Ingredients | Function and Purpose |
|---|---|
| | ity" (350K cycles), excellent "clog" (0 index) and low "wiper debris" (1.0 or less). |
| (f) Polyisocyante Mondur CB-60 | by Mobay Co., a polyisocyanate polymer is a good binder/crosslinker for the phenoxy-in-polyurethane, and a curing agent; i.e., the isocyanates to react with the hydroxyl groups in the phenoxy polymer (the Estane is pre-cured) to form a thermosetting system which provides exceptional flexibility and adhesion/cohesion under extreme environmental conditions. Other like cross-linkers will be evident to workers [e.g. Mondur CB-75 by Mobay; Spenkel P-49-60CX by Spencer Kellog; PAPPI by UpJohn. |
| (g) Catalyst | Ferric Acetyl Acetonate (FeAA) by Mackenzie Co. is a very effective catalyst for the isocyanate/hydroxyl reaction of the binder system. Workers will contemplate others such as Acetyl Acetonate Metal Complex by Mackenzie. |
| (h) Novel FS/FAE Lube System | A liquid FS (like "FS-1265", below) is combined with a suitable FAE (e.g., see butoxyethyl stearate, Ex. I). The butyoxy ethyl stearate is a non-migrating lubricant with some migrating qualities; it also has a plasticizer effect, i.e., the stearate molecules are evenly distributed throughout the pigment/polymer matrix and thus provide constant lubrication throughout the life cycle of the tape. Here, an FAE concentration of 1–7 wt. % of solids is preferred to give desirable surface quality (cf. when combined with FS oil, a very desirable durability and abrasion performance is realized). The butoxy ethyl stearate may be substituted-for, in many cases, by any compatible "fatty acid ester" as defined below. "Fatty Acid Esters": Fatty acid esters suitable with the instant invention are those compatible with the rest of the constituents and derived from a monobasic aliphatic acid of 12 to 20 carbon atoms and a mono-valent alcohol having 3 to 12 carbon atoms. Structure (I) below represents a typical generic |

| Ingredients | Function and Purpose |
|---|---|
| | formula.<br>Structure (I): RCOOR'<br>where: R = alkyl, alkenyl<br>R' = alkyl, aryl, alkenyl, cycloalkyl, etc.<br>Illustrative of some preferred fatty acid esters are: butyl myristate, butyl palmitate, propyl stearate, butyl stearate, butoxy ethyl stearate (the latter two the most preferred).<br>Eliminating the fatty acid ester entirely seems to badly weaken durability (e.g., drops from an optimum 100K+ to about 1K Max. - see below also). |
| (i) Fluorosilicone Oil (FS-1265 by Dow Corning, pref.) | FS-1265 or a like liquid fluorosilicone (FS oil) is found to combine surprisingly well with FAE for CrO$_2$ coatings. It has a migrating effect, providing constant lubrication specifically to minimize friction on the tape surface, yielding very low abrasion there (head-tape contact) and excellent durability (wear resistance).<br>Lubricant System:<br>The subject FS/FAE lubricant system in this formulation will be seen to enhance tape durability and reduce its abrasivity, as well as reducing "clog" and "wiper debris". This lubricant system will be noted as comprising a mixture of "fatty acid ester" and a suitable fluorosilicone oil; Fluorosilicone FS-1265 (Dow Corning Chemical) being preferred.<br>FS-1265 is an oil that was heretofore specified merely for gross lubrication uses (e.g., as a base for pump grease or bearing lube oils, etc.) It was also thought feasible to help smooth a coating's finish; but it was quite unexpected to find that it could be used to ameliorate the durability and abrasivity problems of such a CrO$_2$ computer tape composition - without adverse side effects, and especially in such concentrations. This will not only surprise workers but will prove very practical, because such FS oil is widely available and low in cost (e.g., less expensive than pure fluorocarbon).<br>The lower concentrations of FS-1265 (e.g., about 0.1-.2 wt. % solids) gave very fine durability (e.g., 100K+ cycles - stearate at 1.0% here); but was somewhat too abrasive (abras. index of 123-144). |
| | But doubling the stearate and FS-1265 concentrations (e.g., to about 2 wt. % and .3-.4 wt. % resp.) kept this excellent durability (100K+ cycles) while greatly improving abrasivity (reduced index to 4-40 level).<br>Fluorosilicone Oil Particulars:<br>A low-to-moderate molecular weight FS oil is preferred (e.g., 2K-10K) to assure acceptable coating properties (e.g., excessive molecular weight, high viscosities can yield solvent incompatibility and poor coating surface quality. A viscosity range of 300-10K CTSK is preferred).<br>Concentration is important also: too little % FS will result in unacceptably-high "abrasivity" (see above) and will compromise durability; while too much is likely to lead to unacceptably-high "clog". Thus, we prefer from about 0.3-0.4 up to about 3 wt. % of solids.<br>Of course, the fluorosilicone oil should be very compatible with the binder solvent (e.g., soluble in cyclohexanone, here), while being relatively incompatible with the Binder bulk, and thus forced to "migrate" and lubricate the tape surface during operating life.<br>The ratio of fatty acid ester to fluorosilicone oil determines end product performance; here we usually prefer from about 3/1 to 12/1.<br>Workers will contemplate other analogous fluorosilicone oils that are suitable, in certain instances, for replacing the FS-1265.<br>Examples are:<br>(1) Polymethyl - 3,3,3, - trifluoropropyl siloxane - Three viscosity ranges available: 300, 1,000, 10,000 ctsk, from Petrarch Systems, Inc. (10,000 ctsk visc. levels believed optimum).<br>(2) Polymethyl 1,1,2,2 - tetrahydro-perfluorooctyl siloxane, 100-500 ctsk, by Petrarch Systems, Inc. |
| (j) Cyclohexanone | The organic solvent (dissolving medium) for the polymers also controls the viscosity for dispersion and coating purposes. Other compatible solvents will be evident to workers (e.g., |

-continued

| Function and Purpose of Ingredients: | |
|---|---|
| Ingredients | Function and Purpose |
| | MEK, tetrahydrofuran). |

Formulation methods

The composition of Ex. I is prepared by procedures well known in the art. The formulation premix is milled and dispersed in enough solvent to give a final solid composition with 30 to 40% non-volatiles. Milling is continued until a stable high quality dispersion is obtained.

The final formulation is applied as a thin (e.g., 0.0002") film on computer tape (cf. PET, polyethylene terephthalate web about 0.0014" thick). The so-coated tape is subjected to particle orientation, curing, drying, and surface-treatment as known in the art. A 1.35 mil basefilm is preferred for a high performance tape product; however, a 0.92 mil or thinner basefilm can also be used. Basefilm requirements will depend upon final product packaging and length/data storage requirements.

RESULTS

The desired high performance $CrO_2$ computer tape is produced. It is capable of very high density recording [9,000–30,000 FTP1; cf. 6250 bpi] with associated high output (e.g., by comparison, commercial-grade ferric oxide tape has a maximum data storage capability at approx. 12,000 FTP1).

Other magnetic properties will be superior or better (e.g., squareness 0.947).

Other tape characteristics are acceptable or better, while "Durability" is outstanding and Abrasivity is quite low (without use of alumina or like "durability-enhancers"). More particularly, some exemplary test results indicate:
- a Durability as high as 300K cycles
- an Abrasivity index (Fullmer method) as low as 4–30, presaging much less head-wear (less even than many current ferric oxide tapes).
- a "clog" factor that is excellent ("zero") *
- a "wiper debris" rating as low as 0.1–0.6 **
- Oxide Loading level (cf. 79% in Ex. I):

Please note:

** Memorex Wiper Debris Test: Entire length of tape is passed through normal wipe once; wipe tested for "magnetic debris" (lost oxide) with a "B/H Meter" (0–0.9 is "acceptable").

* Memorex Clog Test: A "clog" is a transfer of sufficient debris from tape to head assembly to cause 10+% reduction in read signal amplitude for 50 ft. tape length. A "clog index" is:

$$\text{no. of clog events} \times \frac{10 \text{ passes}}{\text{actual passes}} \times \frac{8 \text{ tracks}}{\text{act. tracks}} \times 10$$

Formulations with such oxide loading levels (76–79 wt.% or higher; cf. the pigment-to-binder ratio in the final tape formulation of 4.82/1 is considered extremely high for magnetic tape, vs a "normal" 3.63/1) can achieve high outputs at 25K ftpi (more than 180%). Durability is excellent for such high oxide loading levels, as was "wiper debris".

Considering the overall performance, such as $CrO_2$ formulation will be preferred by artisans for high performance computer tape.

The foregoing results are outstanding for a $CrO_2$ computer tape—the results compare very favorably with what conventional Binder-Lube systems offer (those having no $CrO_2$)—as noted below.

Results vs Instances A, B, C

When a comparable $CrO_2$-loading of some "conventional" Binder-Lube systems (cf. Instances A, B and C above) is undertaken, the results demonstrate that the invention (e.g., according to Example I above) is markedly superior in Durability and (low) Abrasivity, as is summarized below in Table I.

TABLE I

| Instance | 6-inch*** Shuttle Durability (K Cycles) | Abrasivity**** Index |
|---|---|---|
| A | <10 | >150 |
| B | <20 | >150 |
| C | <30 | >100 |
| Ex. I (inv.) | >300 (best) | <40 (best) |

Note:
***Higher is better
****Lower is better

Summary Comparison with Other Lube Systems

Case a: Lube: only FAE—inferior

If a lube system for a $CrO_2$ computer tape formulation like Ex. I consisted only of (one or several) "fatty acid esters" (as above defined), the results would be unacceptable. The harsh $CrO_2$ powder would give a tape which wears out much too quickly.

Case b: Lube: FAE plus: silicone oil—inferior

If Case a is modified so the lube system also includes a silicone oil [e.g., MolyKote 4-3600 as in Inst. C], durability would likewise be unacceptable (e.g., about 2K cycles—vs about 300K+ with invention).

Case b': Lube: FAE plus other silicone oil—inferior

For test purposes, the composition of Ex. I is replicated except that the fluoro-silicone oil is replaced by a mere silicone oil (e.g., 0.12% polysiloxane oil with 1.0% butoxy ethyl stearate). Result is low durability and high abrasivity values.

For instance, our test have shown very poor Durability (13K cycles vs 100–300K with Ex. I, using FS-1265); while Abrasivity was not too favorable either (about #100 vs about 20–65 with Example I). This very inferior durability was quite surprising.

Case c: Lube: silicone oil alone—inferior

If the only lube constituent is a silicone oil, durability will be very poor (e.g., Molykote 4-3600 silicone oil by Dow Corning will give about 10K or less).

Case d: Lube: only a fluoro carbon

If the only lube constituent is a fluorosilicone oil (FS-1265 or the like; no fatty acid ester), one will realize a very low durability (about 1K cycles) and poor abrasion values.

If the only lube constituent is a fluorocarbon like Teflon, inferior durability will still result.

Case e: Lube: FAE plus low % FS oil

If the lube of Example I is used, but the wt.% fluoro-silicone oil is reduced (e.g., to <0.1% wt.% as some workers have known for merely enhancing coating smoothness, etc., and without regard to durability or abrasivity (and without reference to high loading with harsh powders like CrO$_2$), the result will be low durability and high abrasion.

Conclusions i. When chromium dioxide is used with a state-of-the-art lubricant system (e.g., as Inst. A, B or C), media wear increases, and durability decreases.
But incorporating a FS/FAE lube according to the invention can increase durability enormously.

ii. Abrasivity tests (either the "Fullmer" abrasivity method or the Memorex in-house-developed "Radicon" test) denote head wear as a function of the abrasivity of the magnetic computer tape. When chromium dioxide is used with the state-of-the-art lubrication system, abrasivity increases markedly. The FS-FAE lube system of the invention can neet this problem also, reducing abrasivity.

iii. The FS/FAE lube also alleviates "clog" and reduces "wear debris".
FS/FAE affords these advantages even for tapes which are heavily-loaded with CrO$_2$—and, rather surprisingly, does so without any trade-off degradation of other properties (e.g., magnetic properties are very excellent).

iv. Various related stearates, by themselves, give radically inferior results (cf. case a).
And supplementing the stearates with other conventional like materials doesn't seem to help much (Inst. A, B), even when one adds a silicone oil (Inst. C, case b); even when one adds FS oil, results are inferior unless enough wt.% is used.

v. Thus, there seems to be little doubt that one needs FAE and the proper % of FS oil to achieve the results indicated here (e.g., good Durability, Abrasivity for CrO$_2$ in-contact media)—whereas either component by itself is relatively ineffective. This is a synergism that will probably surprise workers.

It will be understood that the preferred embodiments described herein are only exemplary, and that the invention is capable of many modifications and variations in construction, arrangement, and use without departing from the spirit of the invention.

Further modifications of the invention are also possible. For example, the means and methods disclosed herein are also applicable for other like (in-contact, computer) tape and flexible media (e.g., floppy disks). Also, the present invention is applicable for providing a lubricant system in other analogous situations (such as for rigid, non-contact media).

The above examples of possible variations of the present invention are merely illustrative. Accordingly, the present invention is to be considered as including all possible modifications and variations coming within the scope of the invention as defined by the appended claims.

What is claimed is:

1. A high-durability/low-abrasivity coating for magnetic records using transducer heads which contact the record, at least periodically, this coating including one or more harsh pigment constituents dispersed in a resin matrix, this matrix including a binary binder system and a migratory lubricant system incorporated therein, this lubricant system comprising a liquid fluoro-silicone and a fatty acid ester combined therewith;
the fluoro-silicone constituting at least a few tenths wt.% of the dry coating solids, barely sufficient to optimize durability and abrasivity, the fluoro-silicone-ester system being sufficiently incompatible with the binder and being of sufficient concentration, sufficiently low viscosity and sufficiently moderate to low molecular weight as to enhance migration of the lubricant, this binder system being comprised of reactive material cured with beam radiation and non-reactive material such that cure thereof has produced an interaction yielding at least one "soft" segment and at least one "hard" segment in a binder system whose recording-related characteristics can be tailored, and wherein material is combined in a prescribed "semi-interpenetrating network".

2. The combination of claim 1 wherein the binder system includes A and B material adapted for cross-linking at any time during fabrication operations, especially after dispersion and after coating surface treatment, this cross-linking being completed to form the "semi-interpenetrating network"; this system also having relatively no troublesome limitations as to "pot life" or "critical surface treatment", and being relatively uneffected by ambient fabrication conditions, and wherein the pigment comprises a CrO$_2$ type material.

3. The combination of claim 1 including materials adapted for cross-linking solely via electron-beam radiation and without need for post-cure heating, also having no "rollset" or substrate distortion problems and attaining maximum cross-linking and related properties without requiring prolonged storage at some predetermined cure temperature regime; and wherein the records are for high density recording and the lubricant system comprises a fluoro silicone oil with migrating properties and a fatty acid ester, this oil being sufficiently incompatible with the binder bulk to induce good migration of the oil to the coating surface during operating life.

4. The combination as recited in claim 2 wherein the "hard" component material comprises a relatively non-polymeric system, some groups thereof remaining "free" and unreacted, and wherein the lubricant comprises from a few tenths up to about 10 wt.% of coating solids of a low-to-moderate molecular weight fluoro-silicone oil.

5. The combination as recited in claim 4 wherein the non-polymeric system was prepared such that no free isocyanate radicals are present during cure, wherein the "hard" component is formed with electron-beam radiation such as to facilitate combination with "soft" component material whereby to form the "semi-interpenetrating network", this network comprising an intimate mixture of relative unseparated polymer networks and wherein from about 0.3–0.4 up to about 10 wt.% of the oil is used; less than will raise "clog" to unsatisfactory levels.

6. The combination as recited in claim 5 wherein the ratio of "hard" to "soft" components is adjusted in accordance with prescribed "target morphology" for the resin matrix; and wherein the binder comprises irradiation-insensitive polyurethane and an irradiation-reactive acrylate.

7. The combination as recited in claim 6 wherein said ratio is adjusted to tailor tensile strength, elongation and/or hardness of the resin matrix; and wherein the acrylate comprises e-Beam curable acrylate urethane, about half the amount of polyurethane; where the ester comprises butoxy ethyl stearate, about ten times the amount of the fluoro-silicone.

8. The combination as recited in claim 1 wherein the binder material is a thermoplastic polymer and includes a "soft" component including a polymeric portion and a resin amenable to radiation curing; and wherein the records are for high density recording and the lubricant system comprises a fluoro-silicone oil with migrating properties and includes sufficient fatty acid ester to assure satisfactory durability, yet to function as a plasticizer and also to migrate to a limited extent.

9. The combination as recited in claim 8 wherein the radiation-cured material is comprised of one or more polymer groups, all exhibiting essentially no free isocyanate, being thus adapted for relatively complete irradiation-cross-linking after all other critical fabrication steps are completed and without need for post-cure heating; and wherein the pigment comprises a $CrO_2$ type material; where the ester is derived from a monobasic aliphatic acid of 12–20 carbon atoms and a monovalent alcohol having 3–12 carbon atoms.

10. The combination as recited in claim 9 wherein the said irradiation is performed after calendering and after all heating steps which might otherwise induce curing.

11. An enhanced-durability magnetic recording tape medium including relatively abrasive magnetic particulates suspended homogeneously in a hydrocarbon matrix, this matrix including a migratory liquid lube system and binder material and comprised of reactive material and non-reactive material such that cure thereof produces an interaction yielding a "soft/hard" segment binder system whose recording-related characteristics can be tailored, the cure being effected solely with irradiation; the lube system being comprised of a fluoro-silicone and a fatty acid ester.

12. The combination as recited in claim 11 as adapted for high-density high-performance computer tape wherein the structure of the fatty acid ester (FAE) satisfies the formula:

FAE: RCOOR′ where R=alkyl or alkenyl
where R′=alkyl, alkenyl, aryl, cyclohexyl or the like; and wherein the "hard" segment is derived from a polymer resin, and wherein the hydrocarbon matrix is produced with essentially no free isocyanate groups.

13. The combination as recited in claim 12 wherein the fatty acid ester constitutes at least one selected from the group consisting of: butyl stearate, butoxy ethyl, stearate, butyl palmitate, butyl myristate, propyl stearate and the like; and wherein the "hard" component is formed with electron-beam radiation such as to facilitate combination with "soft" component material whereby to form the "semi-interpenetrating network", this network comprising an intimate mixture of relative unseparated polymer networks.

14. The combination as recited in claim 13 wherein the ratio of fatty acid ester to fluoro-silicone oil is from about 3/1 to about 12/1.

15. The combination as recited in claim 14 wherein the ester comprises about 1–7 wt.% of coating solids.

16. The combination as recited in claim 14 wherein the ester comprises about 1–7 wt.% butoxy ethyl stearate or butyl stearate.

17. A magnetic recording tape including harsh magnetic particulates suspended in a prescribed plastic matrix, the resin therefor including a "binary binder" system comprised of reactive, "electron-beam curable" material and relatively non-reactive material such that cure thereof produces an interaction yielding a "soft/hard" segment binder system whose recording-related characteristics are tailored according to the ratio of "soft" to "hard" material; this matrix also including a liquid migratory lube system comprising a fluoro-silicone and a fatty acid ester, this lube system being sufficiently incompatible with the binder bulk to induce good migration to the coating surface during operating life.

18. The combination as recited in claim 17 wherein the lubricant comprises from a few tenths up to about 10 wt.% of coating solids of a low-to-moderate molecular weight fluoro-silicone oil; and wherein the binder comprises irradiation-insensitive polyurethane and an irradiation-reactive acrylate.

19. The combination as recited in claim 18 wherein from about 0.3–0.4 up to about 3 wt.% of the oil is used; less than will raise "clog" to unsatisfactory levels; and wherein the acrylate comprises e-Beam curable acrylate urethane, about half the amount of polyurethane; and where the ester comprises butoxy ethyl stearate, about ten times the amount of the fluoro-silicone.

20. In a magnetic recording tape comprising a backing film and a magnetic coating thereon, this coating being comprised of harsh magnetic particles homogeneously suspended in a resinous matrix, the improvement therein whereby the matrix resin material includes a liquid migratory lube system and is selected and treated to form a "semi-interpenetrating network" comprised of "hard" materials and "soft" materials, at least one of said group of materials having been cured by electron beam irradiation; at least some "hard" materials being selected from at least one group of compatible polymeric resins; with the lube system being sufficiently incompatible with the matrix bulk to induce good migration to the coating surface during operating life and comprising a migratory fluoro-silicone/fatty acid ester.

21. A magnetic recording tape comprising a backing film and a magnetic coating thereon, this coating comprising $CrO_2$ magnetic particles within a resinous matrix comprising a liquid migratory fluoro-silicone/fatty acid ester lubricant and a "semi-interpenetrating network" of a soft polymeric material and at least one resin cured by irradiation.

22. The magnetic recording tape of claim 21 wherein the resin is cured by electron beam irradiation and is selected from at least one group of polymeric resins; and wherein the lubricant fatty acid ester constitutes at least one selected from the group consisting of: butyl stearate, butoxy ethyl stearate, butyl palmitate, butyl myristate propyl stearate and the like; with the ratio of fatty acid ester to fluoro-silicone being from about 3/1 to about 12/1.

23. A composition of matter useful as a binder for $CrO_2$ magnetic particles on a magnetic recording tape, this composition comprising the mixture of a migratory liquid fluoro-silicone-fatty acid ester lubricant, a polymeric "soft" segment and a "hard" segment derived from a resin cured by beam irradiation.

24. The composition of matter of claim 23 wherein the "hard" resin comprises at least one functional polymeric resin; and the lubricant fatty acid ester constitutes at least one selected from the group consisting of: butyl stearate, butoxy ethyl stearate, butyl palmitate, butyl myristate, propyl stearate and the like; with the ratio of fatty acid ester to fluoro-silicone being from about 3/1 to about 12/1.

25. In a magnetic recording tape of the type comprising a backing film and a magnetic coating thereon wherein said coating is formed of harsh magnetic particles within a resinous matrix therefor, the improvement comprising a matrix resin in the form of a semi-interpenetrating network comprising a hard component and a soft component, at least one of said components having been cured by beam irradiation; this coating also including a migratory, liquid fluoro-silicone-fatty acid ester lubricant system.

26. A magnetic recording tape comprising a backing film and a magnetic coating thereon, this coating comprising $CrO_2$ magnetic particles within a resinous matrix, this resinous matrix comprising a semi-interpenetrating network of a polyurethane and a resin cured by electrom beam irradiation, plus this coating also including a migratory, liquid fluoro-silicone-fatty acid ester lubricant system.

27. The magnetic recording tape of claim 26 wherein the resin thereof includes a "binary binder" system comprised of reactive material and non-reactive material such that cure thereof produces an interaction yielding a "soft/hard" segment binder system whose recording-related characteristics are thereby tailored; and wherein the fatty acid ester constitutes at least one selected from the group consisting of: butyl stearate, butyl stearate, butoxy ethyl stearate, butyl palmitate, butyl myristate, propyl stearate and the like; with the ratio of fatty acid ester to fluoro-silicone oil being from about 3/1 to about 12/1.

28. The tape of claim 27 wherein said non-reactive material comprises high molecular weight material wherein at least some of said reactive material is sensitive to electron-beam radiation; and where the ester comprises butoxy ethyl stearate, about ten times the amount of the fluoro-silicone.

29. The tape of claim 27 wherein the binder system is radiation-curable and includes A and B material adapted for cross-linking at any time during fabrication operations such as after dispersion and after coating surface treatment, this cross-linking being completed to form an "inter-penetrating network"; this system also having no troublesome limitations as to "pot life" or "critical surface treatment", and being relatively uneffected by ambient fabrication conditions.

30. The tape of claim 27 including materials adapted for cross-linking solely via electron-beam radiation and without need for post-cure heating, also having no "rollset" or substrate distortion problems and attaining maximum cross-linking and related properties without requiring prolonged storage at some predetermined cure temperature regime.

31. The tape of claim 29 wherein a "soft" component comprises both a "first system" which is relatively sensitive to electron-beam radiation and a "second system" which is relatively insensitive thereto; and wherein a compatible "hard" component is combined therewith.

32. The tape as recited in claim 31 wherein the "hard" component is formed with electron-beam radiation such as to facilitate combination with "soft" component material whereby to form a "semi-interpenetrating composite network" in the matrix; the network comprising an intimate mixture of relative unseparated polymer networks; with the ratio of "hard" to "soft" components being adjusted in accordance with prescribed "target morphology" for the resin matrix.

33. The tape as recited in claim 32 wherein said ratio is adjusted to tailor tensile strength, elongation and/or hardness of the resin matrix.

34. The tape as recited in claim 27 wherein the "hard" segment is cured with electron-beam radiation such as to facilitate combination with "soft" component material whereby to form a "semi-interpenetrating composite network" in the matrix; the network comprising an intimate mixture of relative unseparated polymer networks; with the ratio of "hard" to "soft" components being adjusted in accordance with prescribed "target morphology" for the resin matrix.

35. The tape as recited in claim 34 wherein said ratio is adjusted to tailor tensile strength, elongation and/or hardness of the resin matrix.

36. The tape as recited in claim 35 wherein the irradiation is performed after calendering and after all heating steps which might otherwise inducing curing; and wherein the binder comprises irradiation-insensitive polyurethane and an irradiation-reactive acrylate.

37. A magnetic recording tape including harsh magnetic particulates in a resin matrix, the resin thereof including a migratory, liquid fluoro-silicone-fatty acid ester lubricant and a "binary binder" system comprised of reactive radiation-cured material plus relatively non-reactive material such that cure thereof produces an interaction yielding a "soft/hard" segment binder system whose recording-related characteristics are thereby tailored; the fatty acid ester constitutes at least one selected from the group consisting of: butyl stearate, butoxy ethyl stearate, butyl palmitate, butyl myristate, propyl stearate and the like; with the ratio of fatty acid ester to fluoro-silicone oil being from about 3/1 to about 12/1.

38. In a method for preparing a magnetic recording composition including harsh pigment dispersed in a binder, the steps of:
  selecting and arranging this binder to include reactive material and non-reactive material such that cure thereof can produce an interaction yielding a "soft/hard" segment binder system whose recording-related characteristics are thereby tailored; plus a highly migratory liquid lubricant system incorporated therein;
  this lubricant system being selected and arranged to include fluoro-silicone material and fatty acid ester material, such that these materials are sufficiently incompatible and of sufficient concentration, sufficiently low viscosity and sufficiently moderate to low molecular weight as to enhance migration of the lubricant and to so optimize operational durability and abrasion resistance of the composition as well as minimizing clog and generation of debris;
  then intermixing the particulates, applying the system to a record substrate and so curing it.

39. The method as recited in claim 38, wherein said fluoro-silicone is selected and arranged to be at least a few tenths wt.% of dry coating solids up to about 10 wt.% and wherein said ester is derived from a monobasic aliphatic acid of 12–20 carbon atoms and a monovalent alcohol having 3–12 carbon atoms; and wherein the non-reactive material is chosen to exhibit a high molecular weight; and wherein at least some of said reactive material is chosen to be so cured under electron-beam radiation.

40. The method as recited in claim 39 as adapted for high-density high-performance computer tape wherein the structure of the fatty acid ester (FAE) satisfies the formula:

FAE:RCOOR' where R=alkyl or alkenyl
where R'=alkyl, alkenyl, aryl, cyclohexyl or the like; and wherein the binder system is adapted to be radiation-curable and is prepared to include A and B material adapted for cross-linking at any time during fabrication operations, such as after dispersion and after coating surface treatment, whereby cross-linking is completed to form an "inter-penetrating network"; the system, further, being adapted to exhibit no significant "pot life" or critical surface treatment" limitations and to be relatively uneffected by ambient fabrication conditions.

41. The method as recited in claim 40 wherein the fatty acid ester is selected and arranged to constitute at least one selected from the group consisting of: butyl stearate, butoxyl ethyl stearate, butyl palmitate, butyl myristate, propyl stearate and the like and comprises about 1-7 wt.% of coating solids.

42. A method of providing a high-durability/low-abrasivity coating for magnetic records which use transducer heads which contact the record, at least periodically, this method including preparing a binder to include a resin matrix and a lubricant system, this system comprising a liquid fluoro-silicone and a fatty acid ester combined therewith; wherein the fluoro-silicone constitutes at least a few tenths wt.% of the dry coating solids, barely sufficient to optimize durability and abrasivity;

also preparing the matrix to include reactive material and non-reactive material such that cure thereof can produce an interaction yielding a "soft/hard" segment binder system whose recording-related characteristics are thereby tailored; and dispersing one or more "harsh pigment" constituents in the binder.

43. The method as recited in claim 42 wherein the pigment is selected to comprise a $CrO_2$ type magnetic recording material; and wherein the non-reactive material is chosen to exhibit a high molecular weight; and wherein at least some of said reactive material is chosen to be so cured under electron-beam radiation.

44. The method as recited in claim 43 wherein the records are for high density recording and the lubricant system is prepared to comprise a fluoro-silicone oil with migrating properties and a fatty acid ester, this oil being selected to be sufficiently incompatible with the binder bulk to induce good migration of the oil to the coating surface during extended operating life of the record; and wherein the binder system is adapted to be radiation-curable and is prepared to include A and B material adapted for cross-linking at any time during fabrication operations, such as after dispersion and after coating surface treatment, whereby cross-linking is completed to form an "inter-penetrating network"; the system, further, being adapted to exhibit no significant "pot life" or "critical surface treatment" limitations and to be relatively uneffected by ambient fabrication conditions.

45. The method as recited in claim 44 wherein the lubricant is selected to comprise from a few tenths up to about 10 wt.% of coating solids of a low-to-moderate molecular weight fluoro-silicone oil; and wherein the A ane B materials are selected to cross-link under the influence of electron beam radiation and without need for post-cure heating, as well as to exhibit no significant "rollset" or substrate distortion problems and to attain maximum cross-linking and related properties without requiring storage at some predetermined cure temperature regime.

46. The method as recited in claim 45 wherein from about 0.3-0.4 up to about 10 wt.% of the oil is used; less than will raise "clog" to unsatisfactory levels; and wherein the "soft" component is prepared to comprise a "first" system relatively sensitive to elecrton-beam radiation and a "second" system which is relatively insensitive thereto; and wherein these are combined with a compatible "hard" component comprised of relatively non-polymeric acrylates wherein some acrylic groups remain "free" and unreacted.

47. The method as recited in claim 42 wherein the records are for high density recording and the lubricant system is arranged to comprise a fluoro-silicone oil with migrating properties and includes sufficient fatty acid ester to assure satisfactory durability, yet to function as a plasticizer and also to migrate to a limited extent; and wherein the pigment comprises a $CrO_2$ type magnetic recording pigment; where the ester is derived from a mono-basic aliphatic acid of 12-20 carbon atoms and a mono-valent alcohol having 3-12 carbon atoms; and wherein the binder comprises irradiation-insensitive polyurethane and an irradiation-reactive acrylate.

48. The method as recited in claim 47 as adapted for high-density high-performance computer tape wherein the structure of the fatty acid ester (FAE) satisfies the formula:

FAE: RCOOR' where R=alkyl or alkenyl
where R'=alkyl, alkenyl, aryl, cyclohexyl or the like; and wherein the binder comprises irradiation-insensitive polyurethane and an irradiation-reactive acrylate.

49. The method as recited in claim 48 wherein the fatty acid ester constitutes at least one selected from the group consisting of: butyl stearate, butoxy ethyl stearate, butyl palmitate, butyl myristate, propyl stearate and the like; and wherein the ratio of fatty acid ester to fluoro-silicone oil is from about 3/1 to about 12/1.

50. The method as recited in claim 49 wherein the ester comprises about 1-7 wt.% of coating solids.

51. The method as recited in claim 50 wherein the ester comprises about 1-7 wt.% butoxy ethyl stearate or butyl stearate; and wherein the acrylate comprises e-Beam curable acrylate urethane, about half the amount of polyurethane.

52. The method as recited in claim 48 wherein the coil is selected to be sufficiently incompatible with the binder bulk to induce good migration of the oil to the coating surface during operating life; and wherein the lubricant is arranged to comprise from a few tenths up to about 10 wt.% of coating solids of a low-to-moderate molecular weight fluoro-silicone oil; and wherein the acrylate comprises e-Beam curable acrylate urethane, about half the amount of polyurethane.

53. The method as recited in claim 52 wherein from about 0.3–0.4 up to about 3 wt.% of the oil is used; less than will raise "clog" to unsatisfactory levels; and where the ester comprises butoxy ethyl stearate, about ten times the amount of the fluoro-silicone.

54. The method as recited in claim 52 wherein from about 0.3–0.4 up to about 3 wt.% of the oil is used; less than will raise "clog" to unsatisfactory levels; and where the ester comprises butoxyl ethyl stearate, about ten times the amount of the fluoro-silicone; and where the acrylate comprises e-Beam curable acrylate ester epoxy, about 1/5–1/6 the amount of the polyurethane.

* * * * *